United States Patent [19]

Ingram, II

[11] 4,157,937

[45] Jun. 12, 1979

[54] RESOLE RESIN AND POLYVINYL ACETATE IMPREGNATED FILTER PAPER

[75] Inventor: Woodrow H. Ingram, II, Hampden, Mass.

[73] Assignee: Monsanto Company, St. Louis, Mo.

[21] Appl. No.: 879,552

[22] Filed: Feb. 21, 1978

[51] Int. Cl.² ............................................. D21F 11/00
[52] U.S. Cl. .................................... 162/135; 162/165; 162/168 R; 210/508; 427/395; 428/514; 428/530; 428/531
[58] Field of Search ................... 162/165, 166, 168 R, 162/135, 136; 427/395; 260/844; 210/508; 428/514, 530, 531

[56] References Cited

U.S. PATENT DOCUMENTS

| | | | |
|---|---|---|---|
| 2,532,983 | 12/1950 | Alderson | 260/844 |
| 2,631,097 | 3/1953 | Redfern | 162/165 |
| 2,831,783 | 4/1958 | Swiss et al. | 260/844 |
| 3,294,582 | 12/1966 | Suchy | 210/508 |

OTHER PUBLICATIONS

Casey, "Pulp & Paper", vol. II, (1960), pp. 2087, 2088.

*Primary Examiner*—S. Leon Bashore
*Assistant Examiner*—Peter Chin
*Attorney, Agent, or Firm*—David Bennett; William J. Farrington; James C. Logomasini

[57] ABSTRACT

The present invention relates to a resole resin composition comprising a resole resin in combination with a polyvinylacetate resin and a solvent. Said composition provides a flexible bonding composition for filter papers wherein said resin is fast curing and the impregnated cured paper can be pleated after curing without cracking or further curing providing economies for the paper and filter fabricators and a superior filter paper.

9 Claims, No Drawings

RESOLE RESIN AND POLYVINYL ACETATE IMPREGNATED FILTER PAPER

BACKGROUND OF THE INVENTION

The paper used as the filtration medium for automotive type filters has been traditionally treated with a phenolic resole type resin. This has been done to improve the paper's strength properties and allow it to be pleated in an accordian like shape and to hold this shape when the resin is cured. The standard phenolic resin used to treat automotive filter paper have had relatively low mol ratios, i.e., 1.0/1 to 1.3/1 formaldehyde/phenol. This has been necessary so that good final paper properties, especially flexibility, can be achieved. Higher mol ratio resins tend to result in brittle paper when they are cured.

The traditional method of making an automotive type filter has been for a paper maker to treat a base filter sheet with an alcohol solution of these phenolic resole resins. The treated sheet is passed through an oven to drive off the solvent and make a so-called B-staged sheet. This sheet is then shipped to the filter maker where it is pleated and put through an oven to further cure the resin and therefore hold the shape of the pleats.

With the onset of the energy crisis many of the filter manufacturers have requested the paper suppliers to supply a sheet that holds its pleats, needs no high temperature cure thus eliminating the final curing step and the fuel needed to run the curing ovens and still meets all of the requirements of the previous paper.

One approach to this has been for the filter paper manufacturer to cure the sheet saturated with the traditional low mol ratio resins during the B-staging process. This has several disadvantages. First, these low mol ratio resoles are relatively slow curing so that the line speed of the treater is uneconomically low or the treater temperatures very high so that much more fuel is used to achieve the desired degree of cure. A second disadvantage is that these sheets when cured cannot be pleated. They are brittle and crack during the pleating operation. These cracks are obviously undesirable for a filter. The sheet can also be very stiff and difficult to handle when it is put in the metal filter canister or other filter.

It has been found that by using a polyvinyl acetate resin in combination with a relatively high mol ratio phenolic resole, several advantages result. First, the polyvinyl acetate appears to synergistically increase the rate of strength development of the already faster curing high F/P resin as measured by development of filter paper properties. Secondly, the polyvinyl acetate resin plasticizes the brittle high F/P resole and allows paper that has been cured to be pleated without cracking. This paper is also more flexible under the conditions of use and therefore withstands the stress in an oil filter better. A further advantage is that the high F/P resoles contain less of the monomers that volatilize off during the B-staging and curing operations therefore reducing air pollution.

SUMMARY OF THE INVENTION

The present invention relates to a fast curing filter paper impregnating composition comprising in combination:

A. a phenol-formaldehyde resole resin having a formaldehyde to phenol ratio of about 1.5 to 3.0, B. a polyvinyl acetate polymer, said polymer being present in said composition in an amount of from about 10 to 60% by weight based on combined resin and polymer solids, and C. an organic solvent, present in amount such that the solids content of said composition is from about 10 to 75% by weight.

The present invention also relates to a filter paper impregnated with a dried and cured resin composition of the present invention.

PREFERRED EMBODIMENTS

The phenolic resins used in this invention should optimally have an F/P of 2.0/1 or greater, however, resins with lower F/P's will show some of the advantages. The F/P ratio then can be 1.5 to 3.0, preferably 2.0 to 3.0. It has been found that the polyvinyl acetate resin should be moderately low in molecular weight, i.e., less than 60,000. There are two primary reasons for this. First, higher molecular weight resins require more solvent for dilution of the resin for treating and therefore more solvent comes off during drying. This means higher drying temperatures and/or slower treating speeds which reduce the fast curing advantages of the resin. The second reason is that the higher molecular weight polyvinyl acetates tend to reduce the porosity of the treated sheet. This is an obvious disadvantage for a filter paper resin. No lower limit to molecular weight has been found and molecular weights of polyvinyl acetates as low as 10,000 have been found useful. The amount of polyvinyl acetate resin necessary for optimum performance is 30-50% but ranges from about 10 to 60% can be useful depending on the phenolic resin used and the properties desired.

EXAMPLES

EXAMPLE 1

The following formulation was used in preparing the composition as described below. All components of the combination are shown in parts.

| | |
|---|---|
| Phenol | 100 |
| 50% Formalin Solution | 130 |
| 50% Sodium Hydroxide Solution | 5 |
| Methanol | 147 |
| 50% Polyvinyl Acetate Solution (MW = 45,000) in Methanol | 191 |
| Total | 573 |
| Yield on phenol | 515 |

Procedure

Phenol, 50% formalin and 50% sodium hydroxide solution are charged to a reactor equipped for vacuum reflux and distillation. They are heated to a 90° C. reflux temperature from an initial temperature of 40° C. in about 60 minutes. After 100 minutes of reflux at 90° C. the resin is cooled with vacuum to 50° C. and dehydrated to a refractive index$^{(RI)}$ of 1.5800. When RI is met the methanol and polyvinyl acetate solution is charged to the reactor and the resin cooled to 25° C. This gives a product that is 45% solids and 400 cps. viscosity.

EXAMPLE 2

Procedure

The reaction is carried out as in Example 1 except that the reflux time at 90° C. is for 90 minutes. The final product is 60% solids and has a viscosity of 700 cps.

| Formulation Used | |
|---|---|
| Phenol | 100 |
| 50% Formalin Solution | 160 |
| 50% Sodium Hydroxide Solution | 5 |
| Methanol | 68 |
| 67% Polyvinyl Acetate Solution (MW = 11,000 in Methanol | 150 |
| Total | 483 |
| Yield on phenol | 413 |

EXAMPLE 3

The resin is made as in Example 1 except that the polyvinyl acetate resin is omitted.

EXAMPLE 4

Conventional Resole Resin Control

| Formulation | |
|---|---|
| Phenol | 100 |
| 50% Formalin Solution | 70 |
| 50% Sodium Hydroxide Solution | 1.6 |
| Methanol | 30 |

Procedure

Phenol, 50% formalin and 50% sodium hydroxide solution are charged to a reactor equipped for vacuum reflux and distillation. They are heated to a 100° C. reflux temperature from an initial temperature of 40° C. in about 60 minutes. After 110 minutes of reflux at 100° C. the resin is cooled with vacuum to 50° C. and dehydrated as in Example 1. At the end of dehydration the methanol is added and the resulting resin cooled to 25° C. The product formed has a viscosity of 300 cps at 65% solids. This is an example of a conventional phenol resin used in lube oil filters.

Filter Paper Tests

To illustrate the advantages of the invention, each of the above examples in diluted with methanol to approximately 10% solids and a sample of raw automotive lube oil filter paper saturated with this solution. This sheet of paper is dried to remove the solvent which results in a sheet with a resin content of approximately 20%.

In order to measure the fast cure characteristics of these resins, the treated sheets are cured for various lengths of time at a given temperature. The physical paper properties of each sheet are then measured. A good measure of the degree of cure of a treated sheet is to boil the sample of paper for 15 minutes in water after the various cure times and then measure the tensile strength and Mullen (burst) strength of this sample. Table 1 show this cure rate relationship for paper treated with the resins in Examples 1-4 and cured for various lengths of time at 150° C.

TABLE 1

| % of Cure at 150° C. | Time to Reach % of Cure Indicated | | | |
|---|---|---|---|---|
| | 1 | 2 | 3 | 4 |
| 50 | 2.8 | 1.8 | 3.3 | 4.8 |
| 70 | 4.3 | 3.5 | 5.2 | 7.0 |
| 90 | 6.8 | 6.2 | 8.2 | 10.0 |

*% of full cure i.e. cure for 15 minutes at 150° C.

Flex Testing

The flexibility of the treated filter paper can be tested. In this test samples of treated paper are conditioned in motor oil at a given temperature for a specified time. They are then removed from the oil and further conditioned for a period of time at constant temperature (72° F.) and humidity (50% R.H.). They are then tested by folding them over a 1/16"*radius jaws through 180° (90° in one direction then 90° in the other direction). The sample is held under tension and breaks at failure. The total number of flexs are counted and are a measure of the flexibility of the treated sheet.
*(0.159 cm)

After conditioning for 96 hours in oil at 150° C. and further conditioned for 4 hours at 72° F. and 50% R.H., paper treated with the resins from Examples 1-4 gave the following number of flexs.

| Number of Flexs | |
|---|---|
| Example 1 | 40 |
| Example 2 | 35 |
| Example 3 | 2 |
| Example 4 | 40 |

Volatile Testing

Another advantage of this invention is the reduced levels of volatile monomers present in these resins. It has been found that the monomers that volatilize during drying of the paper are primarily phenol, 2-methylol phenol and 4-methylol-phenol. These are responsible for odor and visible emissions evolved. The following table illustrates the reduced levels of these monomers present in Examples 1, 2 and 4.

| | Examples | | |
|---|---|---|---|
| | 1 | 2 | 4 |
| Phenol | 1.7% | 1.1% | 14.0% |
| 2-methylol phenol | 1.4% | 0.5% | 6.5% |
| 4-methylol phenol | 2.0% | 1.2% | 5.5% |

Note: These percents are based on total resin solids, i.e., amount of monomer per 100 parts of resin solids. The conventional resole resin has high levels of volatile monomers and phenol as compared to the resole combination of the present invention.

The resole resin is a phenol formaldehyde resin having a combined formaldehyde to phenol ratio of about 1.5 to 3.0 preferably 2.0 to 3.0 prepared by conventional alkaline catalysis to a A stage resin. The resole resin is dehydrated to a water content of 5 to 40% preferably to 5 to 20% having a viscosity of 200 to 2000 cps at 65% solids.

The composition as prepared has a viscosity of 10 to 1000 cps preferably 300 to 700 cps. For filter treating purposes the composition is diluted with solvent to a viscosity of 10 to 100 cps to insure impregnation of the cellulosic fibers and insure the porosity of the filter. The solvents used are organic solvents selected from the group consisting of methanol, ethanol, isopropanol, acetone, methyl acetate, ethyl acetate or methylethyl ketone or mixtures thereof. Any organic solvent can be used that is miscible with the resin, the polymer and water giving a true solution for treating purposes. The solvent should have a volatility sufficient to give drying rates consistent with commercial drying equipment used.

The filter paper is a porous paper of cellulosic fibers or synthetic fibers such as nylon, polyesters or acrylics or mixtures of said synthetic fibers with cellulosic fibers. Glass fiber papers can be used. The papers can be in woven or mat form having the sufficient porosity for filter purposes as conventionally used in the filter industry. The filter paper can comprise a cellulosic sheet member impregnated with a dried and cured composition of the present invention wherein said dried and cured composition is present in an amount of about 8 to 35% by weight, preferably 10 to 25% by weight based on said impregnated paper.

The vinyl acetate polymer is present in the composition in amounts 10 to 60% by weight, preferably 30 to 50% by weight based on the combined solids of polymer and resole resins. Said resole resin is then present in amounts of 40 to 90% preferably 50 to 70% based on the combined solids of resin and polymer.

What is claimed is:

1. A filter paper comprising a cellulosic base member impregnated with a fast curing bonding composition consisting essentially of:
   A. a phenol-formaldehyde resole resin having a formaldehyde to phenol ratio of about 1.5 to 3.0,
   B. a polyvinyl acetate polymer, said polymer being present in said composition in an amount of from about 10 to 60% by weight based on combined resin and polymer solids, and
   C. an organic solvent, present in amount such that the solids content of said composition is from about 10 to 75% by weight said composition being a solution of (A), (B) and (C) wherein (B) has a molecular weight less than about 60,000.

2. A filter paper of claim 1 wherein said resole resin is dehydrated to water content of 5 to 40%.

3. A filter paper of claim 1 wherein said composition has a viscosity of from about 10 to 1000 cps.

4. A filter paper of claim 1 wherein said polymer is present in an amount of from about 30 to 50% by weight based on combined resin and polymer solids.

5. A filter paper of claim 1 wherein said organic solvent is selected from the group consisting of methanol, ethanol, isopropanol, acetone, ethyl, acetate, methyl acetate, methylethyl ketone or mixtures thereof.

6. A filter paper of claim 1 wherein said polymer has a molecular weight of from about 10,000 to 60,000.

7. A filter paper of claim 1 wherein said resin has a viscosity of from about 200 to 2000 centipoise at 65% solids.

8. A filter paper comprising a cellulosic sheet member impregnated with a dried and cured bonding composition consisting essentially of:
   A. a phenol-formaldehyde resole resin having a formaldehyde to phenol ratio of about 1.5 to 3.0; and
   B. a polyvinyl acetate polymer having a molecular weight less than about 60,000, said polymer being present in said composition in an amount of from about 10 to 60% by weight based on combined resin and polymer solids.

9. A filter paper of claim 8 wherein said paper has said dried and cured composition present in an amount of about 8 to 35% by weight based on said impregnated paper.

* * * * *